J. M. MOORE.
SINGLETREE.
APPLICATION FILED JUNE 9, 1920.

1,424,255. Patented Aug. 1, 1922.

WITNESSES

INVENTOR
J. M. Moore,
BY
ATTORNEYS

UNITED STATES PATENT OFFICE.

JOHN MICHEAL MOORE, OF LAUREL, MISSISSIPPI.

SINGLETREE.

1,424,255.  Specification of Letters Patent.  Patented Aug. 1, 1922.

Application filed June 9, 1920. Serial No. 387,770.

*To all whom it may concern:*

Be it known that I, JOHN MICHEAL MOORE, a citizen of the United States, and a resident of Laurel, in the county of Jones and State of Mississippi, have invented certain new and useful Improvements in Singletrees, of which the following is a specification.

My invention is an improvement in single trees, and has for its object to provide a hook for use in connection with single trees, wherein a guard is provided for the bill of the hook, to prevent said bill from catching growing plants and the like, and preventing injury of the horse's hoof in case the hook should be stepped upon, and for preventing disengagement of the draft tugs.

Figure 1:
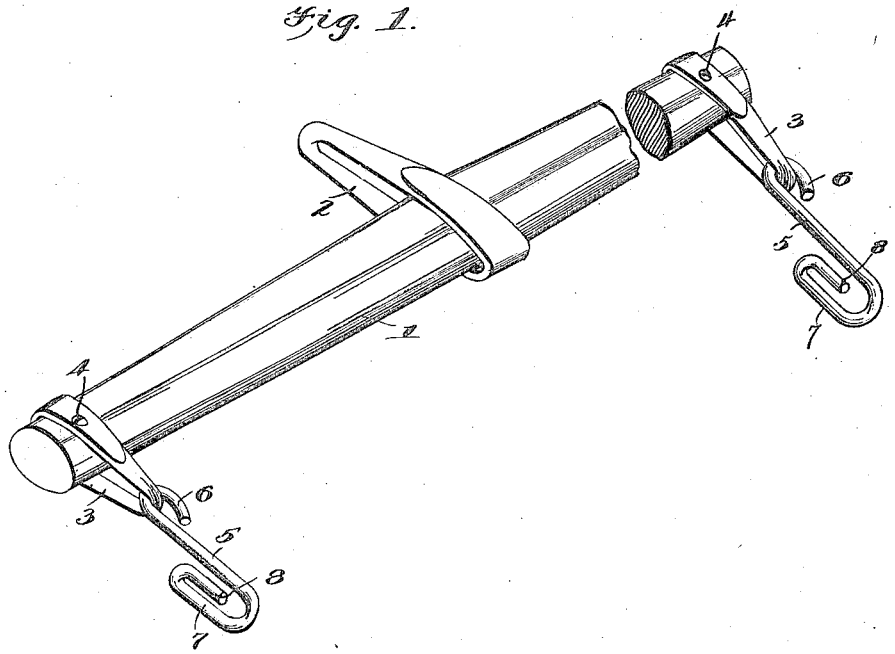
Figure 1 is a perspective view of the improved tree.
Figure 2:
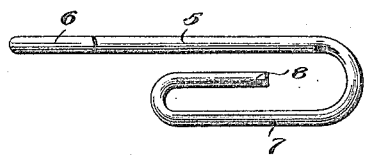
Figure 2 is a side view of one of the hooks.

In the present embodiment of the invention, the tree 1 is of usual construction, having a loop 2 for connecting it with the double tree and having loops 3 at its ends for connection with the hooks to be described.

Each of the loops 2 and 3 is a split loop, the ends of the loop being lapped on the upper side of the tree as shown, and these lapped ends, and the body of the loop may be connected to the tree by means of a screw bolt 4 or the like.

Each of the hooks is composed of a shank 5, having at one end an eye 6, and at the other a portion 7 which is bent to lie substantially parallel with the shank of the hook in spaced relation. This portion 7 has at the end remote from its connection with the shank a portion 8, in the form of an extension, which lies between the shank and the portion 7.

The portion or extension 8 is about midway between the portion 7 and the shank, and it is a trifle more than half the length of the portion 7.

In connecting the tugs with the hooks, they are slipped over the bill which is constituted by the portions 7 and 8 into engagement with the connection between the portion 7 and the shank of the hook. With this arrangement the point of the bill is guarded between the shank 5 and the bill 7. The point is in the plane of the shank and the portion 7, and it is impossible for this point to catch in a growing plant, as for instance a bush or tree, or to injure the horse's foot in case the horse should step upon the hook.

Furthermore, the arrangement of the point prevents accidental dislodgment of the tug from the hook. The bills are turned outwardly, that is they lie on the outer side of the shank as is usual in the hook of this character. The improved hooks may be made of wrought iron or soft steel, and because of this fact they may be made or mended by the ordinary blacksmith.

I claim:

A single tree hook formed from a single length of round metal having a bend intermediate its ends to define a shank and an elongated bill arranged parallel to and in spaced relation to the shank, the terminal portion of said elongated bill being formed with a bend disposing the said terminal portion between and in spaced parallel relation to said shank and said elongated bill, whereby the said terminal portion is guarded, said guarded terminal portion being adjacent the first named bend to constitute a retaining means for a tug, one end portion of said length of round metal being formed with an attaching eye disposed at right angles to the plane of said bill, the said guarded terminal portion, said bill and said shank being in the same plane.

JOHN MICHEAL MOORE.